United States Patent [19]
Takagi et al.

[11] Patent Number: 5,485,556
[45] Date of Patent: Jan. 16, 1996

[54] GRAPHIC DISPLAY DEVICE FOR PROVIDING COLOR IMAGE OF AN OBJECT, BASED ON RADIATIONS INCIDENT UPON THE OBJECT, AND LIGHT REFLECTING CHARACTERISTICS OF THE OBJECT

[75] Inventors: Atsushi Takagi; Junji Nagasaka, both of Toyota; Yoshinori Ogata, Okazaki; Hitoshi Takaoka, Nagoya, all of Japan

[73] Assignee: Toyota Jidosha Kabushiki Kaisha, Japan

[21] Appl. No.: 293,114

[22] Filed: Aug. 19, 1994

Related U.S. Application Data

[63] Continuation of Ser. No. 734,793, Jul. 23, 1991, abandoned.

[30] Foreign Application Priority Data

Jul. 31, 1990 [JP] Japan ................................ 2-204508

[51] Int. Cl.$^6$ .................................................. G06T 15/50
[52] U.S. Cl. .................................................. 395/126
[58] Field of Search ................................ 395/126, 133, 395/135; 434/43

[56] References Cited

U.S. PATENT DOCUMENTS

| | | | |
|---|---|---|---|
| 4,645,459 | 2/1987 | Graf et al. | 434/43 |
| 4,970,666 | 11/1990 | Welsh et al. | 395/126 X |

OTHER PUBLICATIONS

Foley et al. "Computer Graphics Principles and Practice", Addison–Wesley Publishing Company, 1990, pp. 1043–1047.

Foley et al., "Computer Graphics Principles and Practice", Addison–Wesley Publishing Company, 1990, pp. 773–774.

Tomoyuki Nishita and Eihachiro Nakamae; Continuous Tone Representation of Three–Dimensional Objects Illuminated by Sky Light; ACM Transactions on Graphics, vol. 20, No. 4, Aug. 1986, pp. 125–132.

Nelson L. Max: Atmospheric Illumination and Shadows; ACM Transactions on Graphics, vol. 20, No. 4, Aug. 1986, pp. 117–124.

R. Victor Klassen; Modeling the Effect of the Atmosphere on Light; ACM Transactions on Graphics, vol. 6, No. 3, Jul. 1987, pp. 215–237.

Seishi Sekine; Spectral Distributions of Clear Sky Light and Their Chromaticities; J. Illu. Engng. Inst. Jpn., vol. 73, No. 2, 1989.

Masahiro Fukasawa; Color Simuration of Relative Solar Hight and Regard to Atomospheric Scattering; Graphics and CAD, vol. 40, No. 7, Aug. 1989.

"Luminance Distributions of Various Reference Skies," CIE Technical Report, Mar. 26, 1988.

*Primary Examiner*—Mark K. Zimmerman
*Attorney, Agent, or Firm*—Finnegan, Henderson, Farabow, Garrett & Dunner

[57] ABSTRACT

A color graphic display device for providing a color image of an object, including three data memories, a device for preparing display data according to the data stored in the memories, and a color graphic display for providing or displaying the color image of the object according to the display data. The first data memory stores profile data associated with a profile of the object, and the second data memory stores incident-radiation data associated with a spectral distribution of a radiation to be incident upon a surface of the object. The third data memory stores reflection-characteristic data associated with spectral reflection characteristics of the surface of the object.

7 Claims, 13 Drawing Sheets

$$\frac{h}{r} \geqq 15$$

$$1° \leqq \varphi_2 \leqq 2°$$

$$\varphi_1 = \tan^{-1}\frac{r}{h} < 4°$$

GRAPHIC DISPLAY DEVICE FOR PROVIDING COLOR IMAGE OF AN OBJECT, BASED ON RADIATIONS INCIDENT UPON THE OBJECT, AND LIGHT REFLECTING CHARACTERISTICS OF THE OBJECT

This application is a continuation of application Ser. No. 07/734,793 filed Jul. 23, 1991, now abandoned.

BACKGROUND OF THE INVENTION

1. Field of the Invention

The present invention relates in general to a display device for providing or displaying a color image of an object, and more particularly to a technique for effecting high-quality reproduction of colors on the surface of the object.

2. Discussion of the Prior Art

It is useful to display an image of a desired object on a graphic display device, with high color reproduction quality. In designing a motor vehicle, for example, it is necessary to recognize an appearance of the motor vehicle as observed by human eyes. In this case, the color of the vehicle is an important factor.

However, the color of a motor vehicle as perceived by the human eyes varies with the environment in which the vehicle exists. For example, the color of a vehicle painted in a given color, as observed in one region of the earth, differs from that as observed in another region. The amounts of oxygen, ozone, water vapor and other components contained in the atmosphere vary depending upon the position on the earth. Accordingly, the spectral distribution of the natural or solar radiation incident upon the motor vehicle, and that of the radiation reflected from the vehicle, differ from one place to another, causing a difference or variation in the color of the vehicle as perceived by the human eyes.

In view of the above fact, one conventional practice to evaluate the color of a motor vehicle by a vehicle designer is to carry differently colored specimens of the vehicle to various places on the earth, and examine the specimens for the colors as observed in those places, or take color pictures of the specimens for examination by the designer.

The above approach suffers from a considerably large expense for transporting the vehicle specimens painted in many different colors to the various places on the earth, for local chromatic examination of the specimens. Moreover, the expense for this type of examination further increases if it is desired to check a variation in the human-perceived color of the vehicle which occurs depending upon the specific weather and time in the different global places, which also affect the spectral distribution or composition of the radiation incident upon the vehicle. Namely, the observers in the different places must wait until desired weather conditions are satisfied at different times.

Some motor vehicles are designed for use in a relatively limited global area. In this case, too, the chromatic examination of the vehicles must be effected under different weather conditions and at different times. Even in the same area, the spectral distribution of the radiation incident upon the vehicles varies from one local place to another, depending upon whether the atmosphere is clear or contaminated. Thus, the chromatic examination of a vehicle in one area on the earth requires a considerable expense.

The above problem also exists with outdoor ornamental objects, clothes, and many other objects than the motor vehicles, for which the color is an important factor.

Although the outdoor chromatic variation due to a change in the spectral distribution of the natural or sky radiation is comparatively significant, it is sometimes necessary to effect the indoor chromatic examination of furnitures and other indoor ornamental objects, whose colors as perceived by the observer vary with the nature of artificial radiations for indoor lighting.

To examine the variation in the color of an object due to a change in the spectral distribution of a radiation incident upon the object, it is effective to use a device which is capable of displaying color images of the object under different lighting conditions involving different spectral distributions of the incident radiation. However, such a color graphic display device is not known. A color graphic display device capable of color image reproduction according to display data representative of a color image of an object is presently available. Although this color graphic display device permits the color of the displayed image to be changed by changing the display data, it is not capable of providing an image of an object with high color reproduction quality, depending upon a specific radiation incident upon the object, and a surface condition of the object.

SUMMARY OF THE INVENTION

It is therefore an object of the present invention to provide a color graphic display device which is capable of providing a color image of an object with high color reproduction quality, assuming that a radiation having a specific spectral distribution is incident upon the object.

The above object may be achieved according to the principle of the present invention, which provides a color graphic display device for providing a color image of an object, comprising: (a) profile-data memory means for storing profile data associated with a profile of the object; (b) incident-radiation-data memory means for storing incident-radiation data associated with a spectral distribution of a radiation which is to be incident upon a surface of the object; (c) reflection-characteristic-data memory means for storing reflection-characteristic data associated with spectral reflection characteristics of the surface of the object; (d) display data preparing means for preparing display data based on the profile data stored in the profile data memory means, the incident-radiation data stored in the incident-radiation-data memory means, and the reflection-characteristic data stored in the reflection-characteristic-data memory means; and (e) a color graphic display for providing a color image of the object based on the display data.

In the color graphic display device of the present invention constructed as described above, the display data is prepared by the display data preparing means, based on the profile data, incident-radiation data and reflection-characteristic data, and the color image of the object is provided on or by the color graphic display, according to the prepared display data.

For example, the incident-radiation-data memory means stores sets of data representative of selected positions on the earth, sets of data representative of compositions of the atmospheres at the selected positions, sets of data representative of different weather conditions, and sets of data indicative of different times. Alternatively, the incident-radiation-data memory means stores sets of data representative of spectral distributions per se of various radiations to be incident upon the object. Based on these sets of data, the color graphic display is able to provide a color image of the object as if the object was photographed at the selected positions on the earth. The positions on the earth may be defined by the longitude and latitude. If a specific position on the earth and a specific time are given, the azimuth angle and altitude of the sun on the celestial sphere can be determined. The incident-radiation-data may consist of data representative of the spectral distributions per se of direct solar or sky radiations and diffuse solar or sky radiations (radiations from celestial or sky elements), which are actually measured in various areas of the earth.

If sets of data representative of a plurality of combinations of the weather condition and time in a certain area on the earth are stored, the color images of the object as observed in that area can be displayed or provided under different weather conditions and times of a day. If sets of data representative of different areas on the earth or different spectral distributions of the atmosphere are stored, the color images of the object as observed in the different areas can be provided.

According to the present invention, the color image of the object can be provided with high color reproduction quality, based on the data indicative of the spectral distribution or composition of the radiation incident upon each portion of the object surface, and based on the data indicative of the spectral reflection characteristics of the individual portions of the object surface. The present color graphic display device makes it possible to easily examine the variation in the chromatic appearance of the object due to a change in the spectral distribution of the incident light striking the object surface.

For example, the color graphic display device according to the present invention may be effectively used in designing a motor vehicle. In this case, investigations are made to determine the compositions of the atmospheres or the spectral distributions of the direct and diffuse sky radiations in various global areas in which the motor vehicle is used. The sets of data representative of these atmospheric compositions or the spectral distributions of the sky radiations are stored in the incident-radiation-data memory means of the color graphic display device. Therefore, the present invention eliminates the conventional need of actually transporting the motor vehicle to the various places on the earth, for effecting the chromatic examination of the vehicle in those places, whereby the expense for the chromatic examination of the vehicle is appreciably reduced. Conventionally, a considerable time is required to examine the variation in the color of the vehicle as observed under different weather conditions and at different times, even where the area of use of the vehicle is fixed. In this case, too, the present color graphic display device permits the chromatic examination in a short time.

The present color graphic display device is also capable of accurately examining the color of an object which is placed indoors and illuminated by an artificial light, provided that the display data is prepared based on the position of the light source and the spectral distribution of the artificial light.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
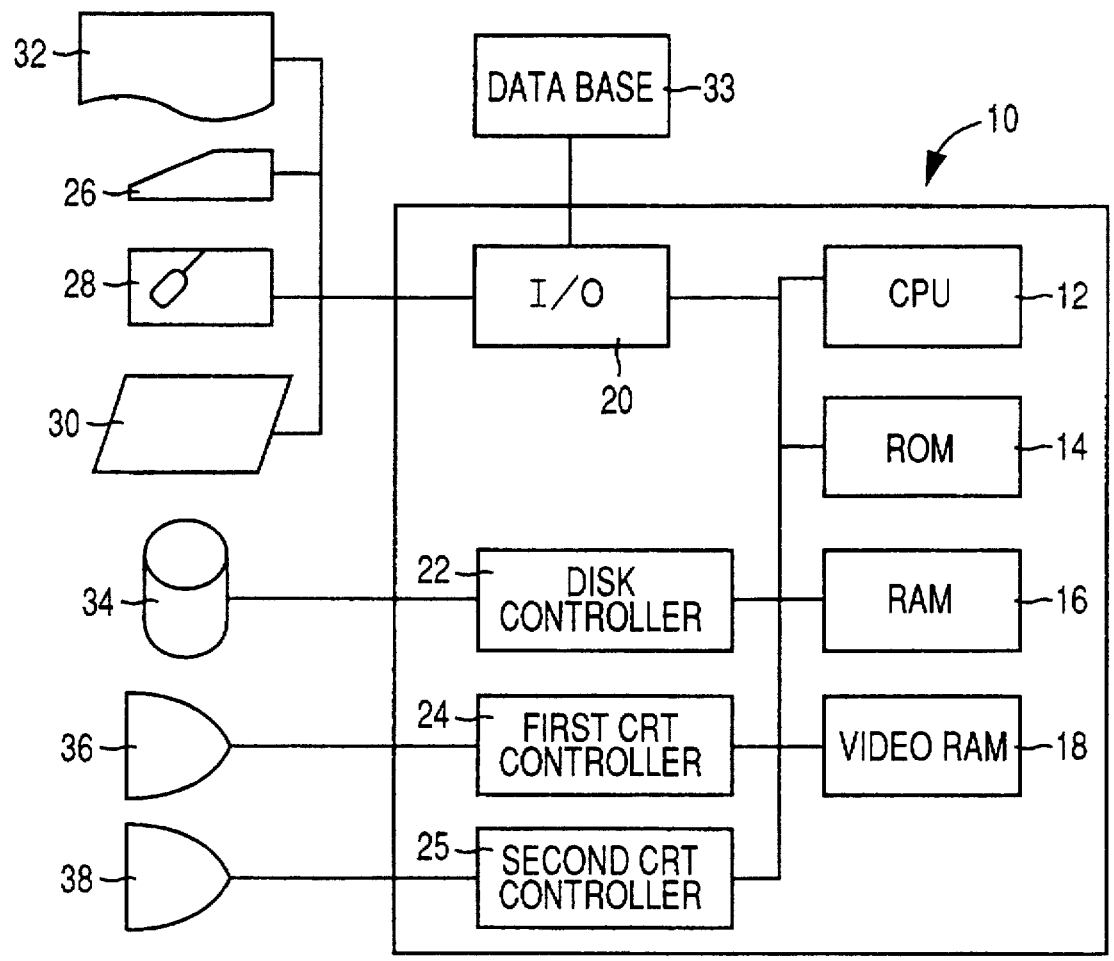
FIG. 1 is a schematic block diagram showing one embodiment of a color graphic display device of the present invention.

While this invention is susceptible of embodiment in many forms, there are shown in the drawings specific embodiments in the form of a color graphic display device adapted to display color images of motor vehicles as observed in various areas on the earth, at different times under different weather conditions. However, it is to be understood that the present disclosure is not intended to limit the invention to the embodiments illustrated.

Referring first to FIG. 1, there is shown a color graphic display device having a computer 10 which incorporates a central processing unit (CPU) 12, a read-only memory (ROM) 14, a random-access memory (RAM) 16, a video RAM 18, an input/output port 20, a disk controller 22, a first CRT controller 24 and a second CRT controller 25.

To the input/output port 20, there are connected as input devices a keyboard 26, a mouse 28 and an image scanner 30, and as an output device a printer 32. The image scanner 30 is provided to read a color photograph of a background scene which is to be displayed on a color graphic display in the form of a cathode ray tube 38 (which will be described). The background scene appears in the background of a color image of an object in the form of a motor vehicle, which is displayed on the color graphic CRT display 38 according to the principle of the present invention as described below in greater detail.

To the input/output port 20, there is also connected a data base 33 which stores profile data associated with profiles of the motor vehicles. The profile data includes data representative of mathematical equations which define or represent Bezier curved surfaces which approximate the profiles of individual portions of each motor vehicle under consideration, which profiles are originally represented by pictorial drawings prepared by a vehicle designer. To the disk controller 22 is connected a disk device 34 which stores data necessary for operations of the computer 10, and data prepared by the computer 10. The data retrieved from the disk device 34 may be transferred to and stored in the RAM 16, and the data stored in the RAM 16 may be transferred to and stored in the disk device 34.

To the first CRT controller 24 is connected a data display in the form of a cathode ray tube 36 adapted to display information helpful to the user upon entry of data through the keyboard 26 and the other input devices. The cathode ray tube 36 is adapted to also display the data entered through the input devices, and the data prepared by the computer 10. To the second CRT controller 24 is connected the color graphic display in the form of the cathode ray tube 38 adapted to display color images of motor vehicles, together with the background scenes, as described above.

The CPU 12 operates according to the control programs stored in the ROM 14, to process the data in the RAM 16, for preparing display data for displaying on the cathode ray tubes 36, 38. The prepared display data is stored in the video RAM 18. The functions of the computer 10 for preparing the display data for the cathode ray tube 38 are schematically illustrated in FIG. 2, wherein the operations indicated in solid blocks within a large block indicated in two-dot chain line are associated with the present color graphic display device, while the operations indicated in solid blocks outside the two-dot chain line block are associated with data entries necessary to operate the color graphic display device.

Figure 2:
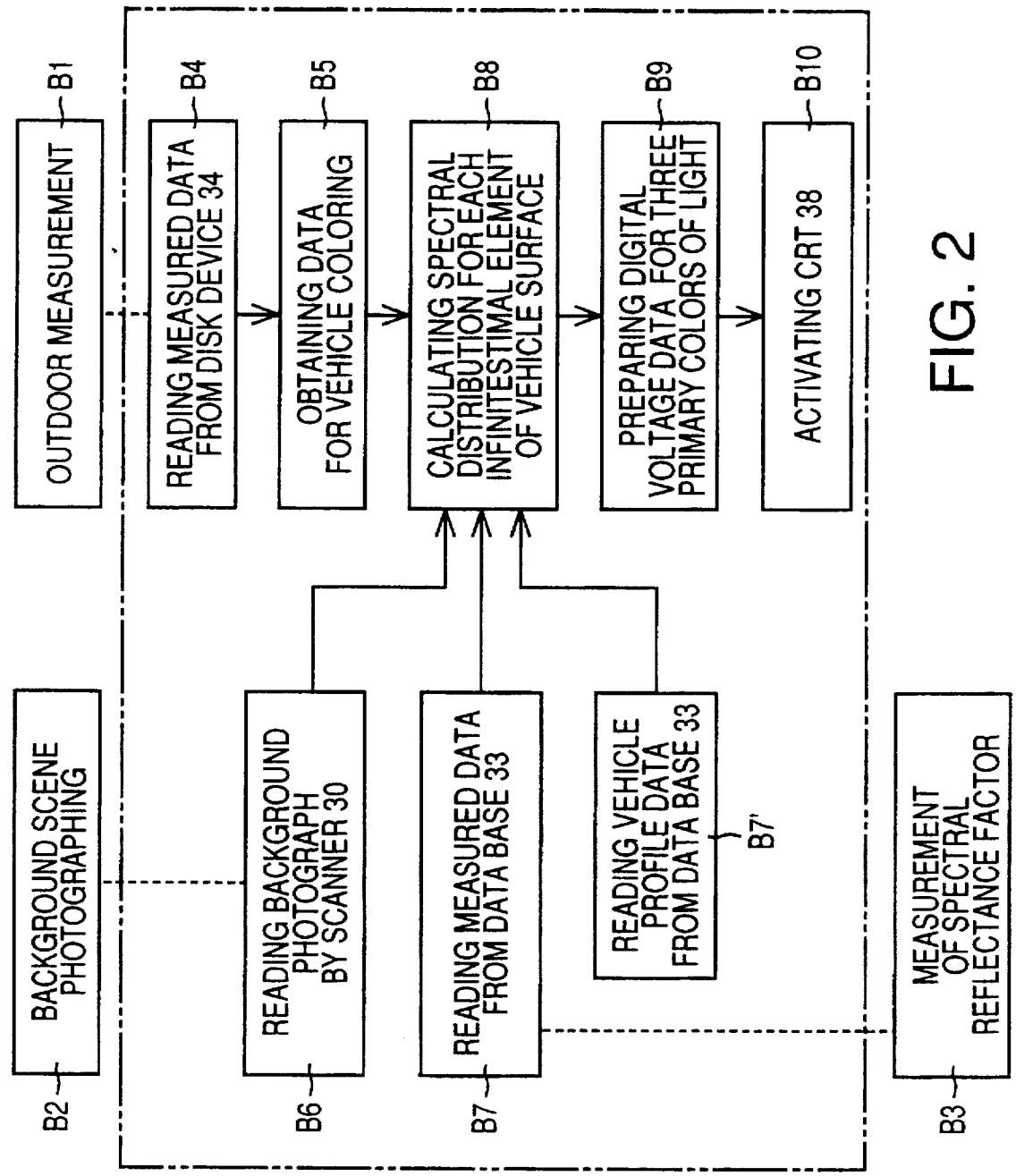
FIG. 2 is a block diagram schematically illustrating the functions of the color graphic display device of FIG. 1.

While blocks B1–B10 will be referred to as operation steps for easy explanation of the corresponding functions, it is to be understood that the block diagram of FIG. 2 is not, in a strict sense, a flow chart showing the events of operations in sequence.

Step B1 is executed to effect outdoor measurements for obtaining data necessary to determine the spectral distributions or compositions of radiations incident upon the motor vehicle. Step B2 is executed to take a color photograph of the background scene which appears in the background of the color image of the motor vehicle displayed on the color graphic display CRT 38. Step B3 is implemented to measure the spectral reflectance factor of the materials which define or form the surfaces of the individual portions of the motor vehicle. The data obtained in step B1 is stored in the disk device 34, and is fed in step B4 from the disk device 34 to the computer 10. The color photograph taken in step B2 is optically read by the image scanner 30, and the output of the scanner 30 is fed to the computer 10, in step B6. The data of the spectral reflectance factor obtained in step B3 is stored in the data base 33, and is read into to the computer 10 in step B7. In step B7', the profile data of the motor vehicle also stored in the data base 33 is read into the computer 10. In step B5, the computer 10 performs calculations based on the data received in step B4, to obtain various kinds of data necessary to color the motor vehicle. In step B8, the computer 10 calculates the spectral distribution of a radiation which is reflected from each infinitestimal element of the surface of the motor vehicle and which is received at the point of observation of the vehicle, i.e., received by the eye of the observer. The calculations in step B8 are based on the data obtained in step B5, and the sets of data received in steps B6, B7 and B7'. In step B9, the calculated spectral distributions of the reflected radiations from the motor vehicle are converted into voltage data representative of voltages applied to activate the cathode ray tube 38, which voltages determine a proportion of three primary colors of light (red, green and blue) at each picture element on the screen of the CRT 38, which corresponds to each infinitestimal element on the surface of the motor vehicle. In step B10, the CRT 38 is activated according to the voltage data, to thereby display a color image of the motor vehicle, together with the background scene.

While the functions of the present color graphic display device have been briefly described by reference to the block diagram of FIG. 2, each function will be described in detail. Before providing a detailed description of each function, there will be described a manner of calculating the spectral distribution of a radiation which is received by the observer along the line of sight from each infinitesimal element of the vehicle surface.

Conventionally, the spectral distribution is expressed by the following equation (1):

$$I(\lambda) = \epsilon(\lambda) + \int_\Omega \rho(\lambda)L(\lambda)\cos\theta d\omega \tag{1}$$

where, $\lambda$=wavelength (nm), $\epsilon(\lambda)$=luminance (w·nm$^{-1}$·m$^{-2}$·sr$^{-1}$) of a radiation emanating from the vehicle along the line of sight, $\rho(\lambda)$=reflectance of the object surface, $L(\lambda)$=luminance of a radiation incident upon the object surface, $\theta$=angle of incidence (rad) of the incident radiation, $d\omega$=differential solid angle (st) of the incident radiation, and $\Omega$=overall solid angle (sr) of the incident radiation.

According to the principle of the present invention, however, it is assumed that the object (motor vehicle) itself does not generate a radiation, and that the light received by the observer along the line of sight consists solely of a radiation reflected by the object surface. Further, the spectral reflectance factor $R(\lambda)$ which can be measured is employed as the parameter indicative of the reflecting characteristic of the object surface. Furthermore, the radiation incident upon the object is divided into a first component which is regularly or directly reflected by the object surface toward the observer, and a second component which is diffuse-reflected or scattered by the object surface, in all directions. The second component is divided into a direct sunlight (direct solar radiation), a sky radiation, and a terrestrial or earth radiation (radiation originating from terrestrial elements). The radiation $I(\lambda)$ received by the observer is expressed by the following equation (2):

$$I(\lambda) = \int_{\Omega_1+\Omega_2+\Omega_3+\Omega_4} R(\lambda)L(\lambda)\cos\theta d\omega \tag{2}$$

where,

106 $_1$=solid angle of the regularly reflected component, $\Omega_2$=solid angle of the direct solar radiation, $\Omega_3$=solid angle of the sky radiation, $\Omega_4$=solid angle of the earth radiation.

Figure 3:
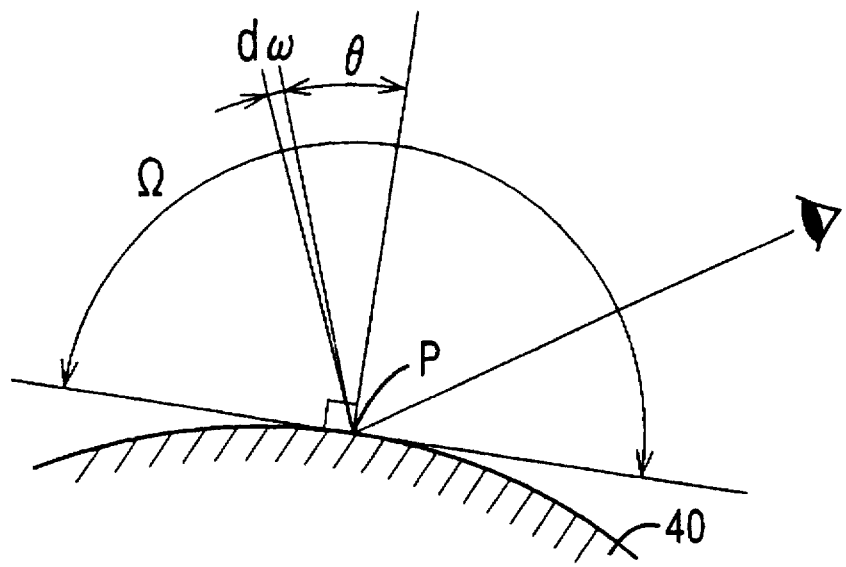
FIGS. 3 and 4 are illustrations explaining calculations of spectral distribution of light from an object, for coloring the object.
Figure 4:
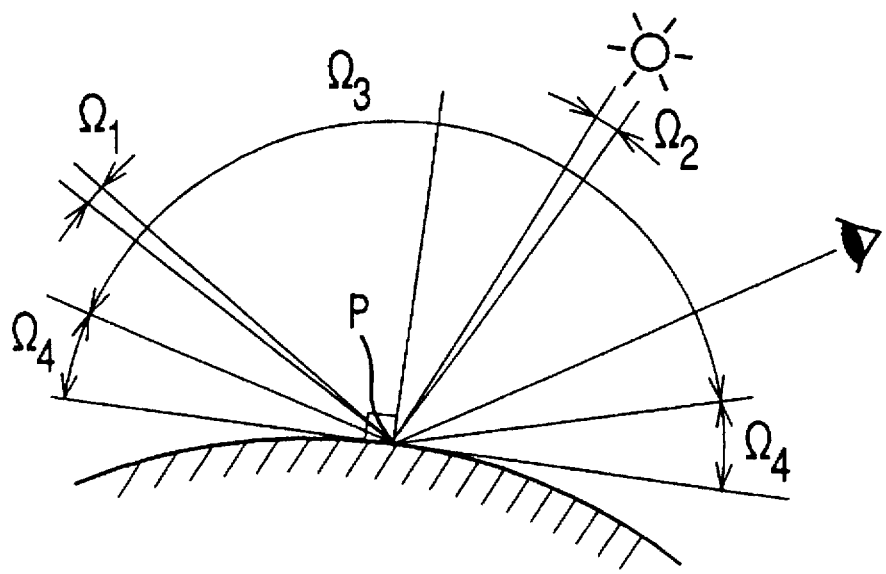

The radiation $I(\lambda)$ is obtained by integration of a solid angle area (as shown in FIG. 4) of an incident radiation $L(\lambda)$ which is incident upon point P on an object 40, at an incident angle of $\theta$ and an infinitesimal solid angle of $d\omega$, as shown in FIG. 3, and which is reflected by the object 40 toward the observer. Namely, the radiation $I(\lambda)$ is also expressed by the following equation (3):

$$I(\lambda)=I_1(\lambda)+I_2(\lambda)+I_3(\lambda)+I_4(\lambda) \quad (3)$$

where, $I_1(\lambda)$=luminance (w·nm$^{-1}$·m$^{-2}$·sr$^{-1}$) of the regularly reflected component, $I_2(\lambda)$=luminance of the diffuse-reflected component of the direct solar radiation, $I_3(\lambda)$=luminance of the diffuse-reflected component of the sky radiation, $I_4(\lambda)$=luminance of the diffuse-reflected component of the terrestrial radiation.

The regularly reflected component $I_1(\lambda)$ is expressed by the following equation (4):

$$I_1(\lambda)=f(\lambda)L_1(\lambda)=fL_1(\lambda) \quad (4)$$

where, $$f(\lambda)=I(\lambda)/I_1(\lambda)=R_1(\lambda)\cos\theta_1 d\omega_1$$

f=Fresnel's coefficient, and $L_1(\lambda)$=luminance of a light source giving the regularly reflected component.

The value $f(\lambda)$ can be approximated by the Fresnel's coefficient f, where the surface of the object 40 is an ordinary painted surface.

The diffuse-reflected component $I_2(\lambda)$ of the direct solar radiation (direct sunlight) is expressed by the following equation (5):

$$I_2(\lambda) = \frac{1}{\pi} R_2(\lambda)Em(\lambda)\cos\theta_2 \quad (5)$$

where, $Em(\lambda)$=illumination intensity or illuminance (w·nm$^{-1}$·m$^{-2}$) at point P of the direct solar radiation, $\theta_2$=angle of incidence of the direct solar radiation at point P, $R_2(\lambda)$=spectral reflectance factor of the direct solar radiation at point P.

The diffused-reflected component $I_3(\lambda)$ of the sky radiation is expressed by the following equation (6):

$$I_3(\lambda) = \int_{\Omega_3} R_3(\phi,\lambda)L_3(\lambda)\cos\theta_3 d\omega_3 \quad (6)$$

where, $R_3(\phi, \lambda)$=spectral reflection factor at point P of the radiation from the sky element, which is reflected toward the observer, $\phi$=angle (FIG. 9) between the direction of observation toward point P (line of sight) and the direction of direct reflection of the radiation from the sky element, $\theta_3$=angle of incidence at point P of the radiation from the sky element, $L_3(\lambda)$=luminance of the sky element, $d\omega_3$=differential solid angle at point P with respect to the sky element.

Practically, the following approximating equation (7) is substituted for the above equation (6):

$$I_3(\lambda)=\Sigma_i R_3 i(\phi, \lambda)L_3 i(\lambda)\cos\theta_3 i\Delta\omega_3 i \quad (7)$$

The diffuse-reflected component $I_4(\lambda)$ of the terrestrial radiation is expressed by the following equation (8):

$$I_4(\lambda) = \int_{\Omega_4} R_4(\phi,\lambda)L_4(\lambda)\cos\theta_4 d\omega_4 \quad (8)$$

where, $R_4(\phi,\lambda)$=spectral reflection factor at point P of the radiation from the terrestrial or earth element, which is reflected toward the observer, $\phi$=angle between the direction of observation toward point P (line of sight) and the direction of direct reflection of the radiation from the terrestrial element, $\theta_4$=angle of incidence at point P of the radiation from the terrestrial element, $L_4(\lambda)$=luminance of the terrestrial element, $d\omega$=differential solid angle at point P with respect to the terrestrial element. Suppose the ground surface is a uniform diffuse reflector whose reflectance is $R_5(\lambda)$, the luminance $L_4(\lambda)$ of the terrestrial element is expressed by the following approximating equation (9):

$$I_4(\lambda) = \frac{1}{\pi} R_5(\lambda)Em(\lambda)\cos\theta_5 + \int_{\Omega^2\pi} R_6(\phi,\lambda)L_3(\lambda)\cos\theta_6 d\omega_6 \quad (9)$$

where, $R_5(\lambda)$=spectral reflectance factor of the direct solar radiation reflected by the ground surface toward point p, $\theta_5$=angle of incidence of the direct solar radiation upon the ground surface, $\omega_2\pi$=solid angle measured upward from the horizon, $R_6(\phi, \lambda)$=spectral reflectance factor of the sky radiation reflected by the ground surface toward point P.

$\theta_6$=angle of incidence of the sky radiation upon the ground surface, $d\omega_6$=differential solid angle of the sky element with respect to the ground surface.

The first term of the above equation (9) represents the spectral distribution or composition of the direct solar radiation which is reflected by the ground surface and is incident upon point P, while the second term of the equation (9) represents the spectral distribution of the sky radiation which is reflected by the ground surface and is incident upon point P.

Practically, the above equations (8) and (9) are approximated by the following equations (10) and (10'), respectively:

$$I_4(\lambda) = \Sigma_i R_4 i(\phi,\lambda)L_4 i(\lambda)\cos\theta_4 i\Delta\omega_4 i \quad (10)$$

$$I_4(\lambda) = \frac{1}{\pi} R_5(\lambda)Em(\lambda)\cos\theta_4 + \Sigma_i R_6 i(\phi,\lambda)L_3 i(\lambda)\cos\theta_6 i\Delta\omega_6 i \quad (10')$$

As described above, the spectral distribution of the radiation received by the observer from point P of the object 40 (FIG. 3) along the line of sight is calculated. To effect this calculation, it is necessary to obtain, by measurement or calculation, various values which include: azimuth angle ($\alpha_s$) and altitude ($\lambda_s$) of the sun; illumination intensity $Em(\lambda)$ of the direct solar radiation incident upon the object; luminance $L_3(\lambda)$ of the sky element; luminance $L_4(\lambda)$ of the terrestrial or earth element; spectral reflectance factor $R_2(\lambda)$ of the object; and spectral reflectance factor $R_3(\phi, \lambda)$, $R_4(\phi, \lambda)$ of the ground surface. The measurement or calculation of the above values is accomplished in the order indicated in the block diagrams in FIGS. 5A and 5B, which shows in more detail the steps B1 and B5 of FIG. 2. There will be described the operation of the instant color graphic display device by reference to FIGS. 5A–5C.

(1) OUTDOOR MEASUREMENT (Step B1)

Figure 5A:
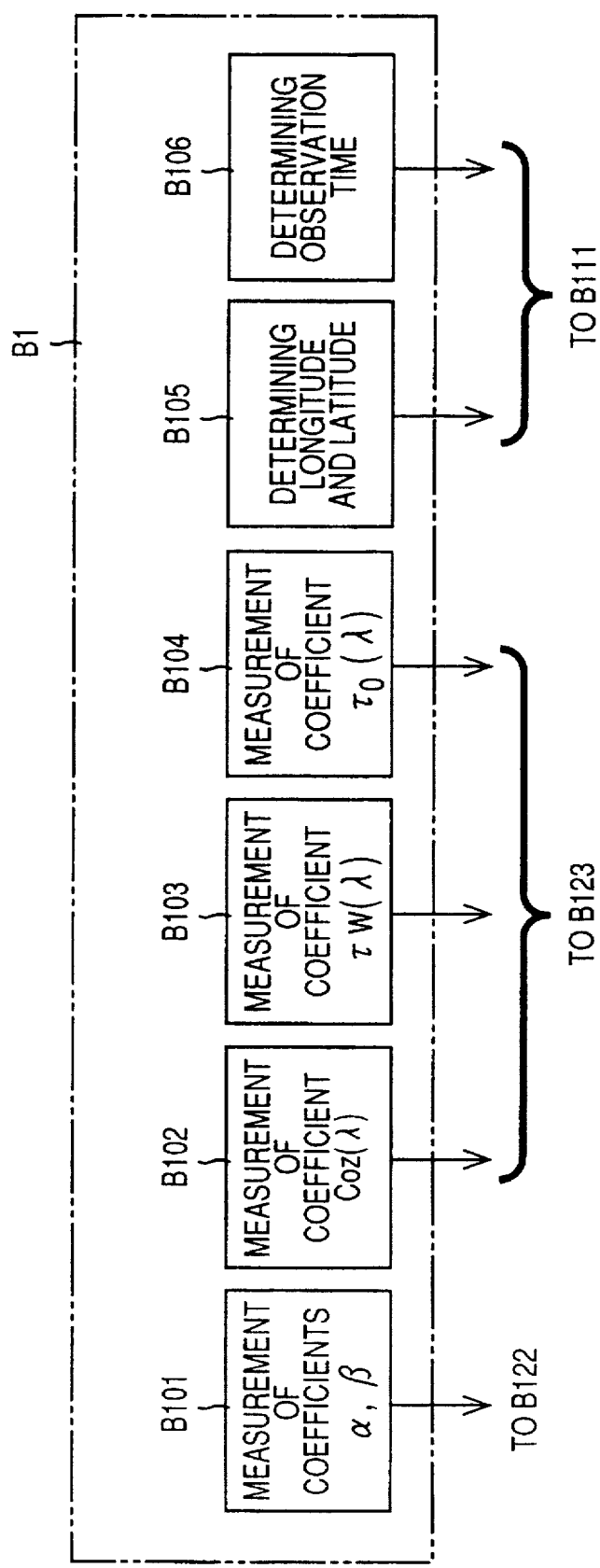
FIGS. 5A–5C are block diagrams showing in detail the functions of the display device which are briefly illustrated in FIG. 2.
Figure 5B:
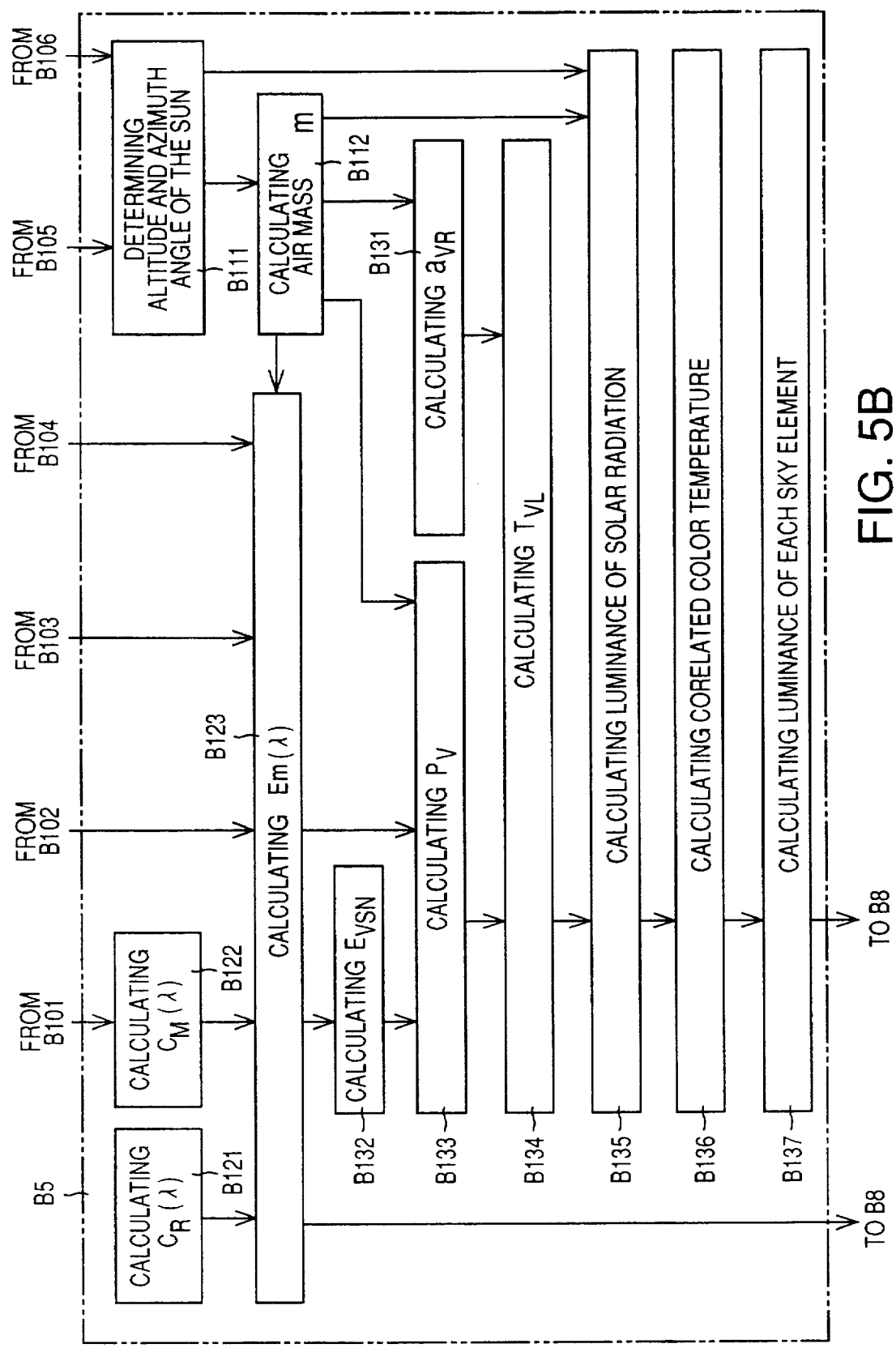
Figure 5C:
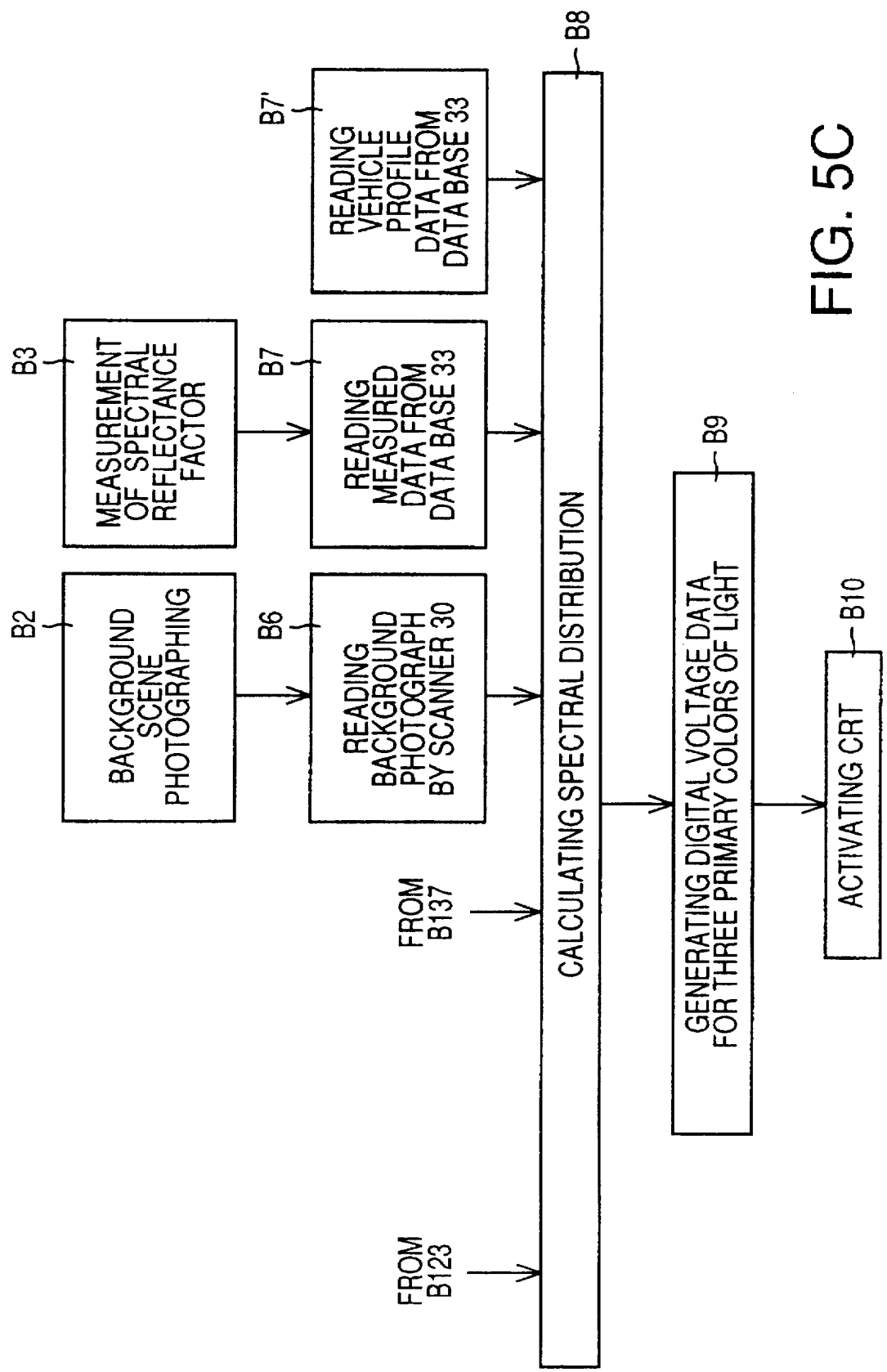

Sub-steps B101–B104 in FIG. 5A are implemented to determine the optical characteristics or properties of the atmosphere. In sub-step B101, there are measured by a sun-photometer a coefficient α representative of the dependence of the atmospheric scattering on the wavelength of radiations, and a turbidity coefficient β of the atmospheres under consideration, i.e., the atmospheres at selected positions on the earth at which the object is to be placed. In sub-step B102, a coefficient $Coz(\lambda)$ of absorption by the ozone in each atmosphere is measured by an ozone measuring instrument. In sub-step B103, a coefficient $\tau w(\lambda)$ of attenuation by the water vapor in the atmosphere is measured by a water vapor measuring instrument. In sub-step B104, a coefficient $\tau_0(\lambda)$ of attenuation by the oxygen in the atmosphere is measured by an oxygen measuring instrument. Since these two attenuation coefficients with respect to the visible spectrum of light have only a little influence on the color image of the object to be displayed on the color graphic display 38, they may be ignored.

In sub-step B105, the longitudes and latitudes of the positions on the earth at which the object is to be placed are determined. In sub-step B106, desired times of a day (Universal time) at which the object is to be placed at the desired global position are determined. The outdoor measurements in sub-steps B101–B104 and the background scene photographing step B2 (described below) are effected for each of the positions and times determined in sub-steps B105 and B106.

(2) BACKGROUND SCENE PHOTOGRAPHING (Step B2)

Figure 6:
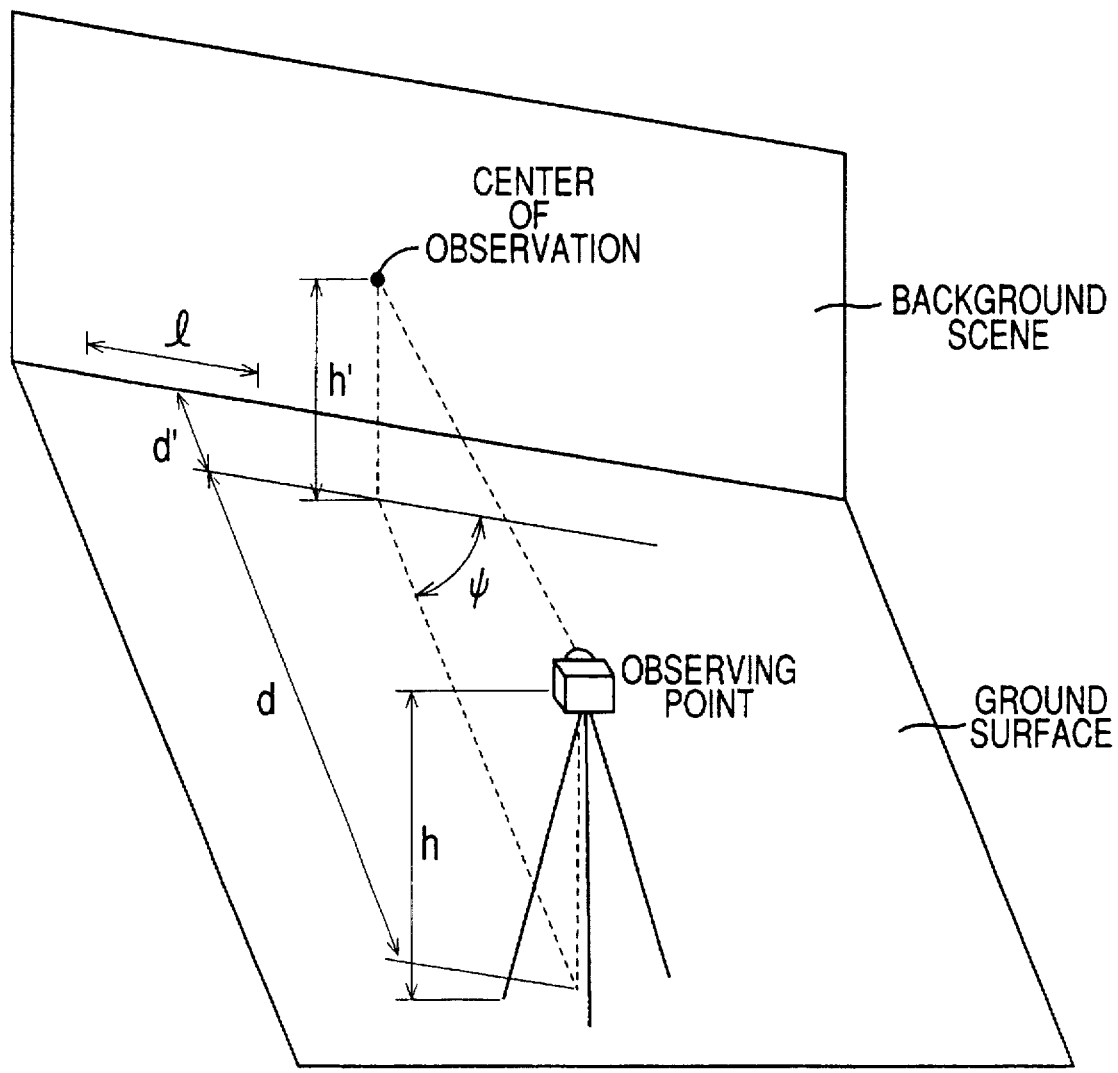
FIG. 6 is a view showing and dimensions and an angle that are measured when a background scene of the object is photographed.

Along with the outdoor measurements described above, color photographs of the scenes in the background of the object are taken by a camera. Before and after the photographing of the background scenes, dimensions h, h', d, d', l (unit: m), and angle Ψ (°) as indicated in FIG. 6 are measured. The dimension l is a length of a characterizing portion of the scene. These dimensions are required for suitably balancing the perspective to the background scene as perceived by the viewer, with that to the motor vehicle (object) as perceived by the viewer when the color image of the motor vehicle is displayed together with the background scene. At the same time, the luminance of a white surface tip which is equal to the maximum luminance of the background scene is also measured, so that the brightness of the motor vehicle and that of the background scene are well balanced.

(3) MEASUREMENTS OF DATA FOR COLORING VEHICLE (Step B5)

Following the outdoor measurements in step B1, step B5 is implemented to obtain data necessary for coloring the motor vehicle. This step B5 consists of sub-steps B111 and B112 to calculate an air mass m, sub-steps B121–B123 to calculate an illumination intensity $Em(\lambda)$ of the direct solar radiation (direct sunlight), and sub-steps B131–B137 to calculate a luminance $L_3(\lambda)$ of the sky radiation. These calculations will be described.

(a) Calculation of Air Mass m

Figure 7:
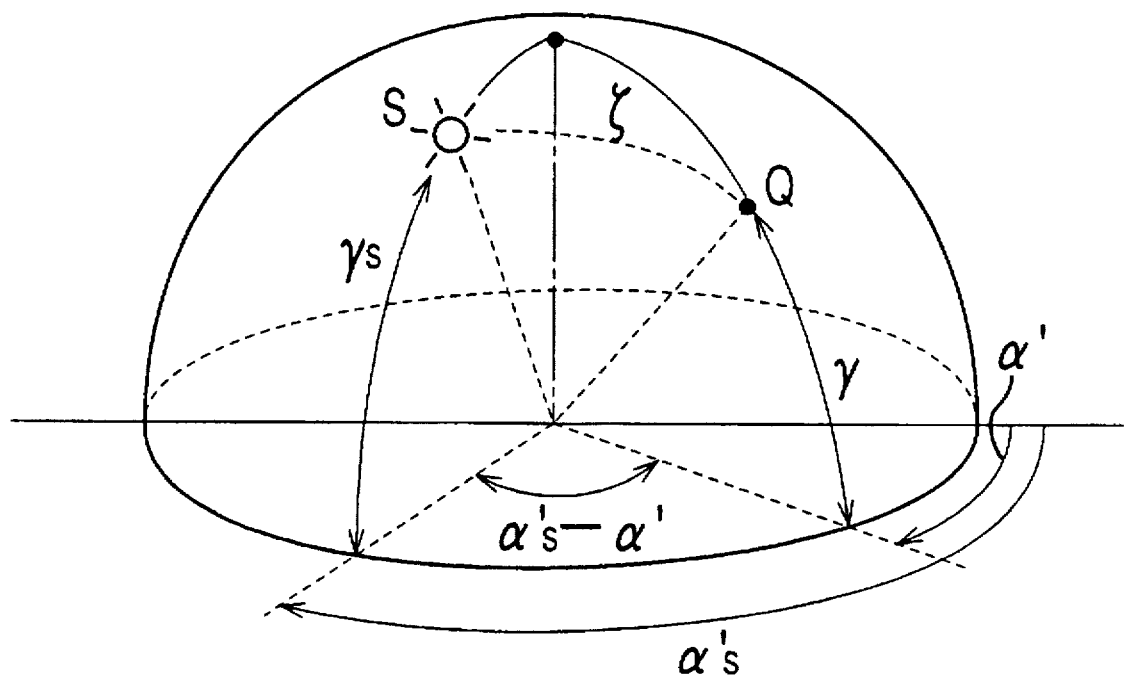
FIG. 7 is a view explaining calculation in the device of FIG. 1, of the luminance of a sky radiation which travels from a given sky element and strikes the object.

In sub-step B111, the altitude γs and azimuth angle αs' of the sun as indicated in FIG. 7 are calculated, based on the global positions and times determined in sub-steps B105 and B106. The solar altitude γs is an angle (rad) of the sun measured from the horizon (ground surface), while the azimuth angle is an angle of the sun measured from 0 rad (terrestrial north) in the clockwise direction as viewed in FIG. 7 (eastward). In the present embodiment, the solar altitude and azimuth angle are both calculated according to the method adopted by the Hydrographic Department of the Maritime Safety Agency.

In the next sub-step B112, the air mass m is calculated according to the following equation (11):

$$m = P/P_0 \{\sin\gamma s + 0.15(180\gamma s/\pi + 3.885)^{-1.253}\} \quad (11)$$

where,

P=atmospheric pressure (atm) on the ground surface, $P_0$=standard atmospheric pressure (atm), γs: rad (b) Calculation of Illumination Intensity $Em(\lambda)$ of Direct Solar Radiation In sub-step B121, the coefficient $C_R(\lambda)$ of absorption by the molecules in the air is calculated according to the following equation (12):

$$C_R(\lambda) = \alpha'' \lambda^{-(3.916 + 0.074\lambda + 0.050/\lambda)} \quad (12)$$

where,

α''=0.00383 (value according to Frolich, Shaw), or 0.00864 (value according to Young)

In sub-step B122, the coefficient $C_M(\lambda)$ of absorption by the aerosol is calculated, according to the following equation (13) including the coefficient α of dependence of the atmospheric scattering on the radiation wave length, and the turbidity coefficient β, which were measured in sub-step B101:

$$C_M(\lambda) = \beta \lambda^{-\alpha} \quad (13)$$

Using the calculated result $C_M(\lambda)$, the illumination intensity $Em(\lambda)$ of the direct solar radiation measured on the ground surface is calculated in step B123 according to the following equation (14):

$$Em(\lambda) = E_0(\lambda) \tau_0(\lambda) \tau w(\lambda) e^{-F(\lambda)m} \quad (14)$$

where, $$F(\lambda) = C_R(\lambda) + C_M(\lambda) + Coz(\lambda),$$

$E_0(\lambda)$=illumination intensity outside the atmosphere, (c) Calculation of Luminance $L_3(\lambda)$ of Sky Radiation In sub-step B131, an average extinction coefficient $a_{vR}$ of dry clean air with respect to light is calculated according to the following equation (15) which includes the air mass m calculated in sub-step B112:

$$a_{vR} = 1/(10 + 0.045\,m) \quad (15)$$

In step B132, a solar irradiance $E_{VSN}$ (klx) is calculated according to the following equation (16):

$$E_{VSN} = \int_0^\infty Em(\lambda) \bar{y}(\lambda) d\lambda \quad (16)$$

In sub-step B133, an air transmissivity Pv is calculated according to the following equation (17) which includes the air mass m calculated in sub-step B112:

$$Pv = (E_{VSN}/E_{VO})^{1/m} \quad (17)$$

where, $E_{VO}$ is a solar constant (klx) expressed as follows:

$$E_{V0} = \int_0^\infty E_0(\lambda)\bar{y}(\lambda)d\lambda = 129.1$$

In sub-step B134, a Linke's turbidity factor $T_{VL}$ is calculated according to the following equation (18) which includes the air transmissivity Pv and average extinction coefficient $a_{VR}$ which were calculated in sub-steps B133 and B131:

$$T_{VL} = \ln(Pv^{-1/a}VR) \tag{18}$$

In the next sub-step B135, luminance Lhomo(kcd/m$^2$) at a given point Q in the sky or celestial sphere (FIG. 7) is calculated according to the following equation (19) which includes the turbidity factor $T_{VL}$ calculated in sub-step B134, solar altitude γs and azimuth angle αs' both calculated in sub-step B111, and air mass calculated in sub-step B112:

$$LHOMO(\gamma s, \gamma, \xi, T_{VL}) = \tag{19}$$

$$C_0/m_2\{G(\gamma,\rho)R(\gamma s)/Z + \epsilon(m, m\gamma \cdot f(\xi) - X_1 - 3) - 2(A+B)\}$$

where,

γ, γs, ζ, α', α's=angles (rad) indicated in FIG. 7,

C0=Evo/16π=7.705 (kcd/m$^2$),

δ=(A−B)/(ms−Mγ), where γ≠γ, or $a_{VR}T_{VL}B$, where γs=γ,

G(γ, ρ)=0.8+ρ$^3$+1.64(1−0.7 ρ$^3$)sinγ +(1−ρ)(1−1.5sinγ)A,

ρ=reflectance (=0.2) of the ground surface, R(γs)=1 30 B+1.5(1−B)sinγs

A=$e^{-a}$VR$^{m\gamma T}$VL

B=$e^{-a}$VR$^{m\gamma T}$VL

Z=1+$T_{VL}$(0.075−0.025$X_1$)(1−ρ), $X_1$=0.115375N,

N=4.3$T_{VL}$1.9$_e$−(0.35$T_{VL}$),

M=0.71/$T_{VL}$0.5 , f(ζ)=1+N($e^{-3\zeta}$−0.009)+Mcos$^2$ζ, cosζ=sinγs sinγ+cosγs cosγ·cos|α's−α'|, ms=1/[sinγs+0.15 {γs(180/π)+3.885}$^{-1.253}$], mγ=1/[sinγ+0.15 {γ(180/πm)+3.885}$^{-1.253}$]

The above equation (19) was proposed by R. Kittler, and is described in detail in Technical Report, 1988 of the CIE (Commission Internationale de l'Eclairage; International Commission on Illumination). According to this equation, the luminance Lhomo (kcd/m$^2$) of the sky is continuously variable, with the turbidity factor $T_{VL}$ as a major parameter, from that of clear sky to that of cloudy sky.

After the luminance values at various points in the sky are calculated as described above, sub-step B136 is implemented to calculate correlated color temperatures $T_{CP}$ at the various points in the sky, according to the following equations (20) and (20'):

$$T_{CP} = 1.1985 \times 10^8/\text{Lhomo}^{1.2} + 6500 \tag{20}$$

where $T_{VL} \leq Tx$, or alternatively, $$T_{CP} = 6500 \tag{20'}$$

where $T_{VL} > Tx$.

The value Tx is obtained by interpolation using the values in Table 1 below.

TABLE 1

| γs | 0 | 10 | 20 | 30 | 40 | 50 | 60 | 70 | 80 | 90 |
|---|---|---|---|---|---|---|---|---|---|---|
| Tx | 6.8 | 7.8 | 9.2 | 9.6 | 9.0 | 8.2 | 7.6 | 7.2 | 7.0 | 6.8 |

Figure 8:
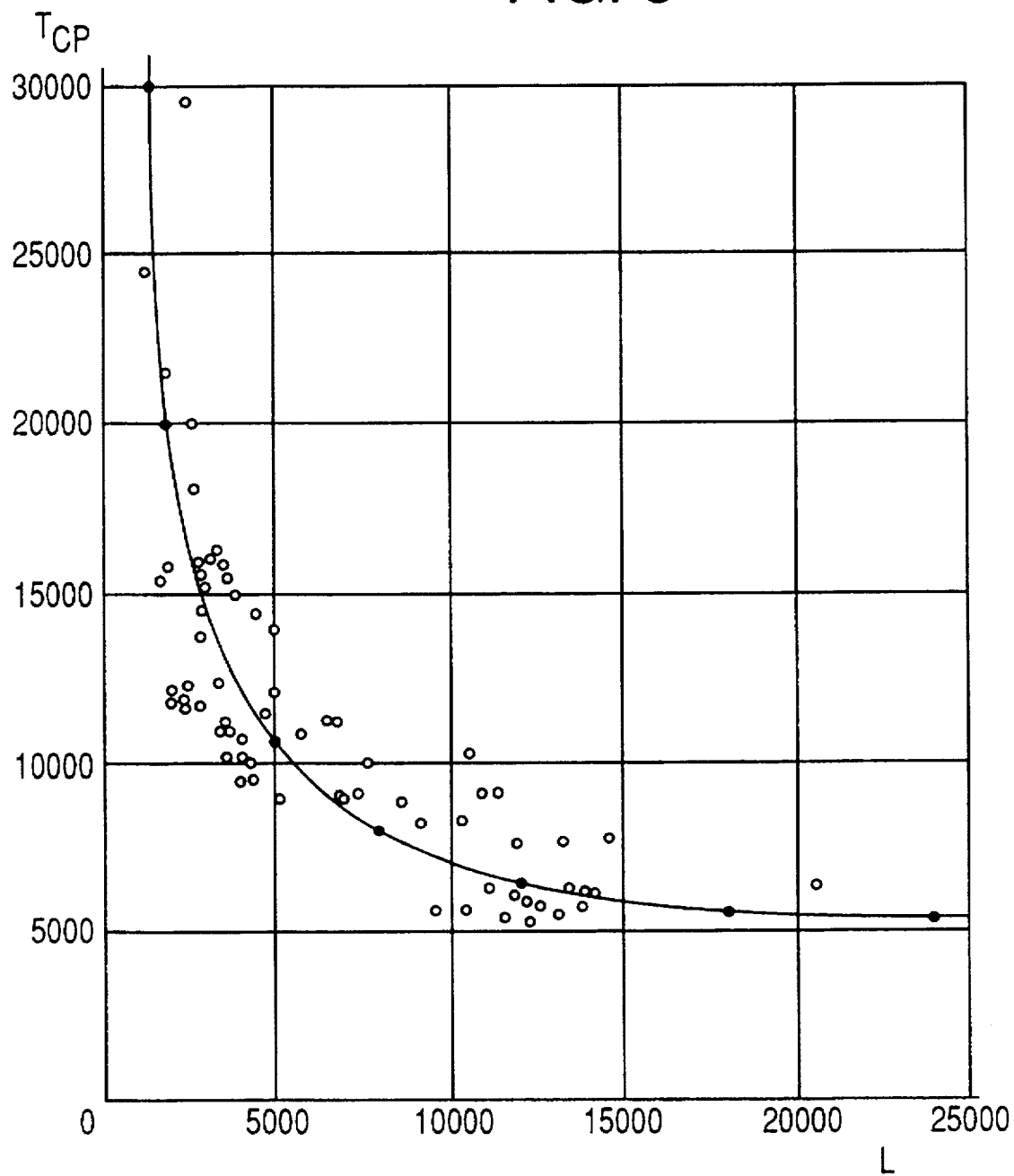
FIG. 8 is a graph indicating a relationship between the sky luminance and the correlated color temperature.

The above equation (20) was formulated by the present applicants, based on actually measured luminance values (L) and correlated color temperatures $T_{CP}$ at various points in the sky, as indicated in the graph of FIG. 8. The graph shows that there exists a relationship between the sky luminance and the correlated color temperatures. One feature of the present color graphic display device is the utilization of this fact to determine the spectral distribution of a sky radiation from each point or element in the sky as a light source, based on the luminance of each sky element.

Successively, sub-step B137 is implemented to calculate the luminance $L_3(\lambda)$ of each sky element, using the following equations (21), (22) and (23) according to the CIE for determining the chromaticity coordinate values $x_D$, $y_D$ of the XYZ color system (Japanese Industrial Standard JIS Z8701) for artificial daylighting. Where the correlated color temperature $T_{CP}$ ranges from 4000K to 7000K, the chromaticity coordinate values $x_D$, $y_D$ are obtained according to the equations (21) and (23). Where the correlated color temperature $T_{CP}$ exceeds 7000K, the chromaticity coordinate values $x_D$, $y_D$ are obtained according to the equations (22) and (23).

$$x_D = -4.6070 \times 10^9/T^3_{CP} + 2.9678 \times 10^6/T^2_{CP} + \tag{21}$$
$$0.09911 \times 10^3/T_{CP} + 0.244063$$

$$x_D = -2.0064 \times 10^9/T^3_{CP} + 1.9018 \times 10^6/T^2_{CP} + \tag{22}$$
$$0.24748 \times 10^3/T_{CP} + 0.237040$$

$$y_D = -3.000x_D^2 + 2.870x_D - 0.275 \tag{23}$$

Based on the obtained chromaticity coordinate values $x_D$ and $y_D$, the luminance $L_3(\lambda)$ of each sky element is calculated according to the following equations (24), (25) and (26):

$$M_1=(-1.3515-1.7703x_D+5.9114y_D)/(0.0241+0.2562x_D-0.7341y_D) \tag{24}$$

$$M_2=(0.0300-31.442x_D+30.0717y_D)/(0.0241+0.2562x_D-0.7341y_D) \tag{25}$$

$$L_3(\lambda)=S_D(\lambda)=S_0(\lambda)+M_2S_2(\lambda) \tag{26}$$

The values $S_0(\lambda)$, $S_1(\lambda)+S_2(\lambda)$ are specified in Table 3 appended to JIS Z8720.

(4) MEASUREMENT OF SPECTRAL REFLECTANCE FACTOR (Step B3)

There will next be described the measurement of the spectral reflectance factor of the object surface, i.e., the surface of each portion of the motor vehicle. To display a color image of the object on the color graphic display CRT 38 with high color reproduction quality, it is necessary to not only accurately analyze the radiations incident upon the object surface, but also accurately analyze the reflectance of the object surface. Where the object is transparent, it is necessary to also accurately analyze the transmissivity of the object. In the present embodiment, however, the object (motor vehicle) is supposed to be opaque.

The light reflection by the object surface is either direct or regular reflection or diffuse reflection.

(a) Regular Reflection

The direct or regular reflection should be exactly and carefully considered since it is important in that it determines or greatly affects the image reproduction of a bright or glossy object. The regular reflection is controlled by regular reflectance of the object, which varies with the material of the object. In this respect, the regular reflectance should be considered for each portion of the object made of a specific material. The regular reflectance of a pure glass surface which does not undergo diffuse reflection is determined according to the Fresnel's equation. However, the painted surfaces, metal surfaces, resin surfaces and glossy rubber surfaces of a motor vehicle, for example, exhibit optical properties other than those determined by the Fresnel's equation, and it is difficult to work out a formula for directly determining the regular reflectance of those surfaces. In the present embodiment, therefore, the regular reflectance values of the individual surface portions of the vehicle are actually measured. Since a clear sky radiation is polarized, the regular reflectance of the vehicle exposed to the clear sky radiation should be determined with the polarization taken into account, for assuring high image reproduction quality. According to the present embodiment, the regular reflectance f is expressed by the following equation (27), which includes actually measured values $r_s$, $r_p$, s and p: ps $$f=(pr_s^2+sr_p^2)/(s+p) \tag{27}$$

where, $r_s$=amplitude reflectance of an s-component of Fresnel wave, $r_p$=amplitude reflectance of a p-component of Fresnel wave, s=energy ratio of an s-component of the incident radiation, and p=energy ratio of a p-component of the incident radiation.

The above equation (27) was formulated by the present inventors. Where s=p, the above equation is identical with a well known equation $f=(r_s^2+r_p^2)/2$ for determining the regular reflectance.

(b) Diffuse Reflection

Figure 9:
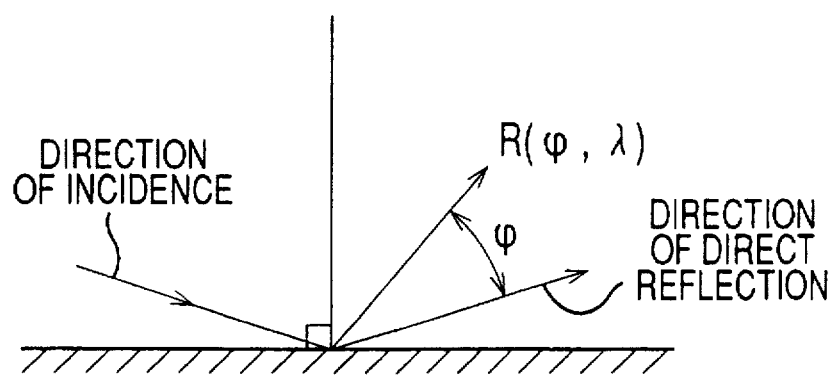
FIG. 9 is a view explaining measurement of the spectral reflectance factor of the object surface.

For assuring high color reproduction of the vehicle image, a particular care should be taken in analyzing the diffuse reflection. In the present embodiment, the spectral reflectance factor of each material defining the vehicle surface is measured by a variable-angle spectrophotometer, which is adapted to measure the spectral reflectance factor $R(\phi, \lambda)$ while the angle $\phi$ with respect to the direction of the regular reflection as indicated in FIG. 9 is changed.

Figure 10:
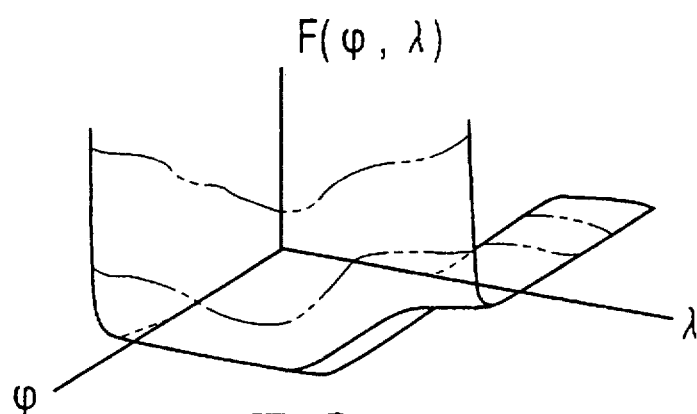
FIGS. 10 and 11 are graphs showing the results of the measurement of the spectral reflectance factor, where the object surface is a solid-painted surface and a metallic-painted surface, respectively.
Figure 11:
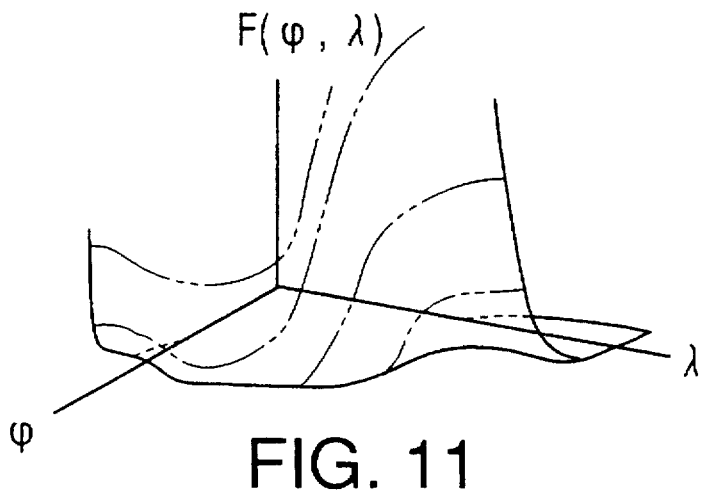

The graphs in FIGS. 10 and 11 show the results of measurements of the spectral reflectance factor $R(\phi, \lambda)$ of an ordinary painted surface and a metal-painted surface. Within a range of the angle $\phi$ between 10° and 20°, the ordinary painted surface can be considered as a uniform diffuse reflector having a substantially constant spectral reflectance factor $R(\phi, \lambda)$. On the other hand, the spectral reflectance factor $R(\phi, \lambda)$ of the metal-painted surface considerably varies with the angle $\phi$, and consequently exact sampling is required with respect to the varying angle $\phi$. In particular, it is noted that the proportion of the diffuse sky radiation and terrestrial radiation is considerably high under a cloudy weather condition in which the amount of the direct sunlight is relatively small. In this case, therefore, the diffuse sky and terrestrial radiations should be carefully and exactly sampled in determining the spectral reflectance factor of the metal-painted surface. Further, the spectral reflectance factor $R(\phi, \lambda)$ for the angular range of $0°<\phi<30°$ should be accurately measured with utmost cares, since the value $R(\phi, \lambda)$ greatly changes over that angular range and considerably influences the image reproduction of the vehicle under a cloudy sky.

(5) CALCULATION OF SPECTRAL DISTRIBUTION (Step B8)

Based on the data thus obtained in step B5, the calculations according to the equations (4), (5), (7), (10) and (10') are effected as described above.

(6) PREPARATION OF DISPLAY DATA (In Step B9)

The preparation of the display data for displaying a color image of the vehicle image on the CRT display 38 consists of the following three calculating operations: calculation of three stimulation values X, Y and Z for each picture element on the screen of the CRT display 38 (color graphic display), based on the obtained spectral distribution of the incident radiation and the obtained spectral reflectance factor $R(\phi, \lambda)$ of the vehicle surface; calculation to convert the calculated three stimulation values X, Y and Z into three light components R, G and B; and calculation to convert the three light components R, G and B into display data representative of digital voltage values $D_R$, $D_G$ and $D_B$ which are applied to the CRT display 38 to display a color image of the vehicle with the determined light components R, G, B (three primary colors of light). These three calculating operations will be described.

(a) Calculation of Three Stimulation Values X, Y and Z

The three stimulation values X, Y and Z are calculated according to the following equations (28), (29) and (30), respectively, based on the radiation $I(\lambda)$ received by the observer, which radiation consists of the direct solar radiation, sky radiation and terrestrial radiation that are reflected by the vehicle surface, and based on the spectral reflectance factor $R(\lambda)$ [$R(\phi, \lambda)$ for the sky and terrestrial radiations] of each portion of the vehicle surface:

$$X=1/k\int R(\lambda)I(\lambda)\bar{x}(\lambda)d\lambda \tag{28}$$

$$Y=1/k\int R(\lambda)I(\lambda)\bar{y}(\lambda)d\lambda \tag{29}$$

$$Z=1/k\int R(\lambda)I(\lambda)\bar{z}(\lambda)d\lambda \tag{30}$$

where, $\bar{x}(\lambda)$, $\bar{y}(\lambda)$, $\bar{z}(\lambda)$=color matching function, k=proportion constant=$100\int I(\lambda)\bar{x}(\lambda)d\lambda$.

(b) Conversion of X, Y, Z into R, G, B

The conversion of the above-calculated three stimulation values X, Y and Z into the three light components R, G and B is effected on the following assumption:

1) The luminance values of the three light components R, G, B are constant irrespective of a change in the chromaticity.
2) The chromaticity values and the luminance values of the light components R, G, B are not mutually influenced.
3) The screen of the CRT display 38 has no local variation in the chromaticity and luminance.
4) The luminance values of the light components R, G and B do not vary with time.
5) The chromaticity and luminance of the light components R, G, B remain constant even when the display 38 is turned on after it is turned off.

Before the conversion, the following values of the CRT display 38 are measured:

i) Chromaticity of highest-whiteness color . . . ($x_w$, $y_w$)
ii) Chromaticity of light component R . . . ($x_R$, $y_R$)
iii) Chromaticity of light component G . . . ($x_G$, $y_G$)
iv) Chromaticity of light component B . . . ($x_B$, $y_B$)
v) Three stimulation values for highest-whiteness color . . . (Xw, Yw, Zw)

The conversion of the three stimulation values X, Y, Z into the three light components R, G, B is effected to determine voltage values r, g, b ($0 \leq r, g, b \leq 1$) applied to the CRT display 38 for illuminating a picture element on the screen of the display with the three primary colors of light R, G, B, which correspond to the stimulation values Xc, Yc, Zc of a given infinitestimal element of the vehicle surface. It is noted that the values r, g, b and the values $Y_R$, $Y_G$, $Y_B$ of the display 38 have the following relationships:

$$Y_R = rY_{Ro}, Y_G = gY_{Go}, \text{ and } Y_B = bY_{Bo}$$

where, the values $Y_{Ro}$, $Y_{Go}$ and $Y_{Bo}$ represent the luminance values of the three light components R, G, B for producing the highest-whiteness color (color having the highest whiteness).

Initially, the luminance values $Y_{Ro}$, $Y_{Go}$ and $Y_{Bo}$ for the highest-whiteness color are calculated according to the following equations (31) and (32):

$$A = \begin{bmatrix} x_R/y_R & x_G/y_G & x_B/y_B \\ 1 & 1 & 1 \\ (1-x_R-y_R)/y_R & (1-x_G-y_G)/y_G & (1-x_B-y_B)/y_B \end{bmatrix} \quad (31)$$

$$\begin{bmatrix} Y_{Ro} \\ Y_{Go} \\ Y_{Bo} \end{bmatrix} = A^{-1} \begin{bmatrix} Xw \\ Yw \\ Zw \end{bmatrix} \quad (32)$$

Then, the voltage values r, g, b for each picture element (pixel) on the screen of the CRT display 38 are calculated according to the following equations (33) and (34):

$$B = \begin{bmatrix} Y_{Ro} & 0 & 0 \\ 0 & Y_{Go} & 0 \\ 0 & 0 & Y_{Bo} \end{bmatrix} \quad (33)$$

$$\begin{bmatrix} r \\ g \\ b \end{bmatrix} = (AB)^{-1} \begin{bmatrix} Xc \\ Yc \\ Zc \end{bmatrix} \quad (34)$$

(c) Conversion of r, g, b into $D_R$, $D_G$, $D_B$

The voltages r, g, b corresponding to the three light components R, G, B, which are applied to the CRT display 38, are represented in 256 steps by digital values $D_R$, $D_G$, $D_B$ in the form of eight bits, which are used as the display data according to which the computer 10 controls the color graphic display in the form of the CRT 38. The conversion of the voltage values r, g, b into the digital values $D_R$, $D_G$, $D_B$ is effected according to the following equations (35), (36) and (37):

$$D_R = \{(r-b_R)/a_R\}^{1/\gamma R} \quad (35)$$

$$D_G = \{(g-b_G)/a_G\}^{1/\gamma G} \quad (36)$$

$$D_B = \{(b-b_B)/a_B\}^{1/\gamma B} \quad (37)$$

The digital values $D_R$, $D_G$, $D_B$ as the display data are prepared for each picture element on the screen of the CRT color graphic display 38 are stored in the video RAM 18. The values $a_R$, $a_G$, $a_B$, $b_R$, $b_G$ and $b_B$ are variables, and the values $b_R$, $b_G$ and $b_B$ are positive values close to zero, which represent dark currents. These variables are actually measured on the specific display 38 used for the color graphic display device.

(7) ENTRY OF BACKGROUND SCENE DATA
(in Step B6)

While the display data for displaying a color image of a motor vehicle on the color graphic CRT display 38 is prepared as described above, the present embodiment is adapted to provide the color image of the vehicle, together with a background scene also presented in full color. For this purpose, the color photograph of the background scene actually taken is read by the image scanner 30, and the display data for displaying the background scene is prepared from the output of the image scanner 30. More specifically, digital values $D_R$, DG, $D_B$ corresponding to the three light components for each infinitestimal element of the background scene are obtained from the output of the scanner 30. These digital values are converted into the voltage values r, g, b applied to the display 38, which are then converted into respective three stimulation values X, Y, Z. The thus obtained stimulation values X, Y, Z are modified for matching of the background scene with the reproduced image of the vehicle placed under a specific condition. Based on the modified stimulation values X, Y, Z, the modified digital values $D_R$, $D_G$, $D_B$ are obtained as the display data for the background scene, which is stored in the video RAM 18. The dimensions and the angle as indicated in FIG. 6 are measured upon photographing of the background scene, to determine the reading pitch of the photograph by the scanner 30 so that the distance to the background scene as perceived by the observer is balanced with the distance to the vehicle as perceived by the observer. The images of the background scene and the vehicle are positioned relative to each other such that the center of the vehicle is aligned with the center of observation indicated in FIG. 6.

(8) DISPLAYING VEHICLE AND BACKGROUND SCENE IMAGES (in Step B10)

The color graphic CRT display 38 is activated under the control of the second CRT controller 25, to provide a color image of a desired motor vehicle placed in a specific environment (position, time and weather condition), together with a color image of the suitable background scene, based on the appropriate sets of display data stored in the video RAM 18.

Figure 12:
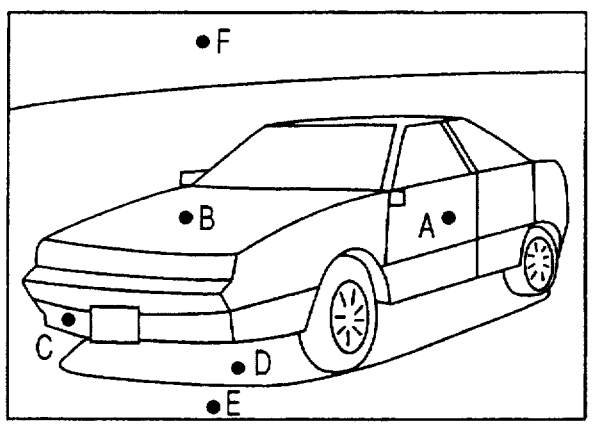
FIG. 12 is a perspective view of a motor vehicle as the object, showing the positions of sample points whose chromaticity and luminance values were calculated, for comparison of the calculated values with actually measured values, for confirming the accuracy of color simulation of the object according to the present invention.
Figure 13:
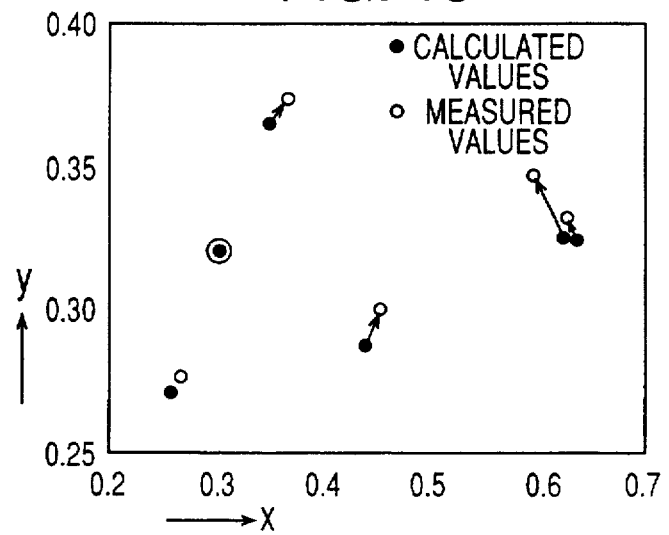
FIGS. 13 and 14 are graphs indicating the calculated and measured values of chromaticity and luminance.
Figure 14:
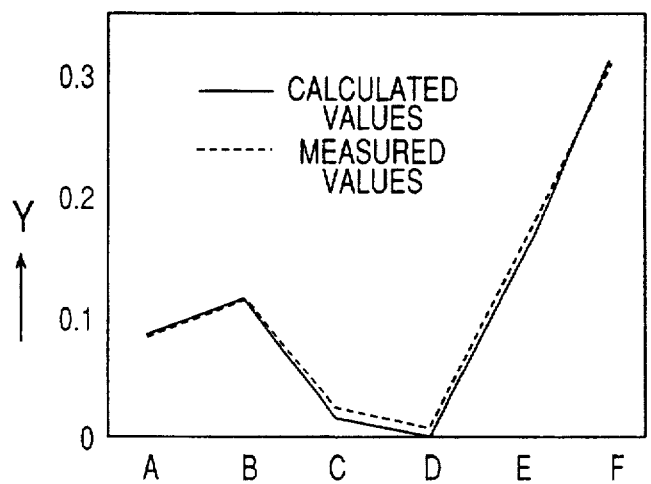

For evaluating the color reproduction accuracy of the display 38, the chromaticity and luminance values actually measured at points A through F (as indicated in FIG. 12) in a certain environment of a vehicle and a background scene were compared with the corresponding values which are calculated according to the principle of the invention as described above. The graphs of FIGS. 13 and 14 indicate the actually measured and calculated values of the chromaticity and those of the luminance, respectively. It will be understood from these graphs that the calculated values are very close to the actually measured values. That is, the graphs show that the present color graphic display device is capable of displaying color images of the vehicle and the background scene, with high color reproduction quality.

In the present embodiment described above, the illumination intensity (illuminance) of the direct solar radiation on the ground surface is calculated based on the composition of the atmosphere, and the luminance of the object surface due to the incident radiation from each sky element, based on the solar altitude and azimuth angle and the turbidity factor of the atmosphere. According to this arrangement, exact color reproduction of a motor vehicle as the object is possible, for any environment (time and weather condition) in which the vehicle is placed, which environment can be changed by suitably selecting the composition and turbidity factor of the atmosphere, and the solar altitude and azimuth angle. However, it is possible to effect the color reproduction on the CRT display 38, based on the actually measured illumination intensities of the direct solar radiation and diffuse radiations from the sky elements, rather than the calculated values. In this case, the color reproduction of the vehicle is not possible for a desired combination of the solar altitude and azimuth angle, weather condition and/or other parameters. However, this modified embodiment is advantageous for improved color reproduction quality owing to the actual measurement of the illumination intensities.

Figure 15:
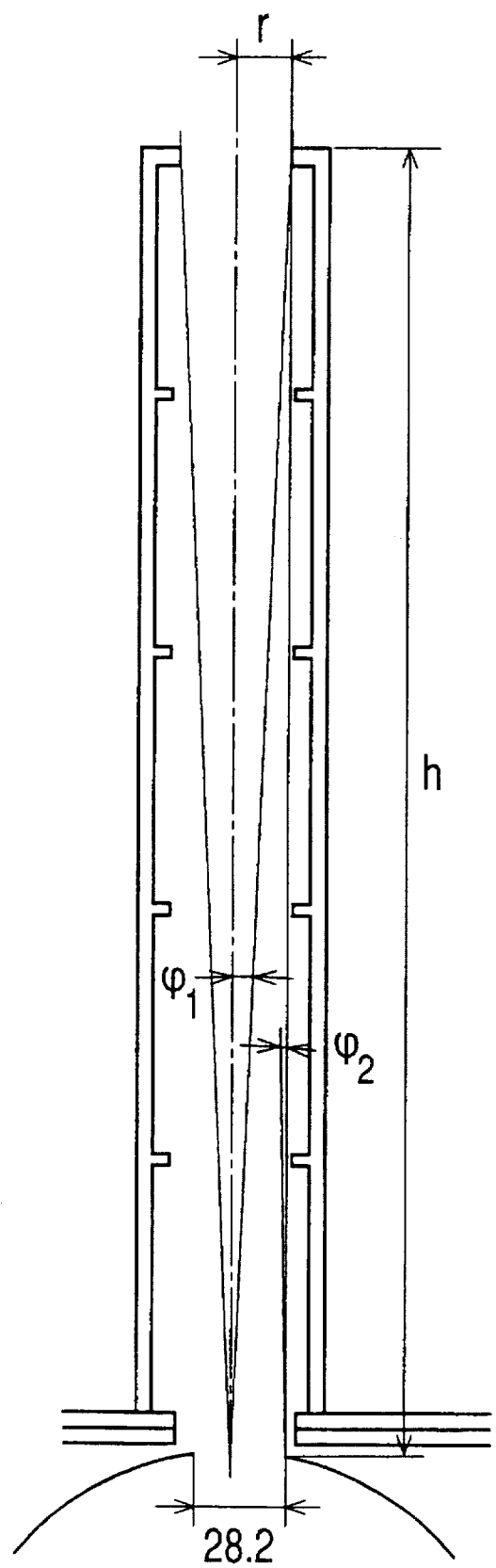
FIG. 15 is a front elevational view in cross section of a device used in another embodiment of the invention, for measuring the illumination intensity of a direct solar radiation.

The measurement of the illumination intensity of the direct solar radiation is effected by a measuring device as shown in FIG. 15, which is recommended by the WMO (World Meteorological Organization).

Figure 16:
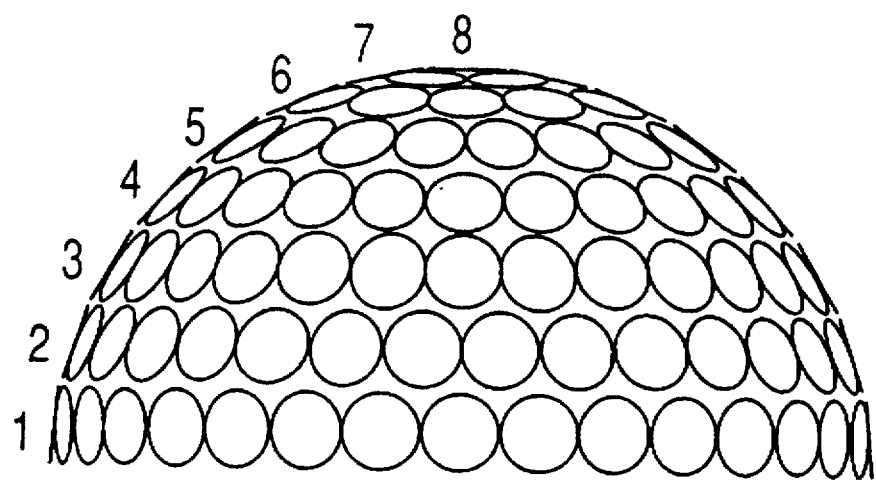
FIGS. 16 and 17 are a side elevational view and a plan view, respectively, which indicate the points or areas of measurement of the illumination intensity.
Figure 17:
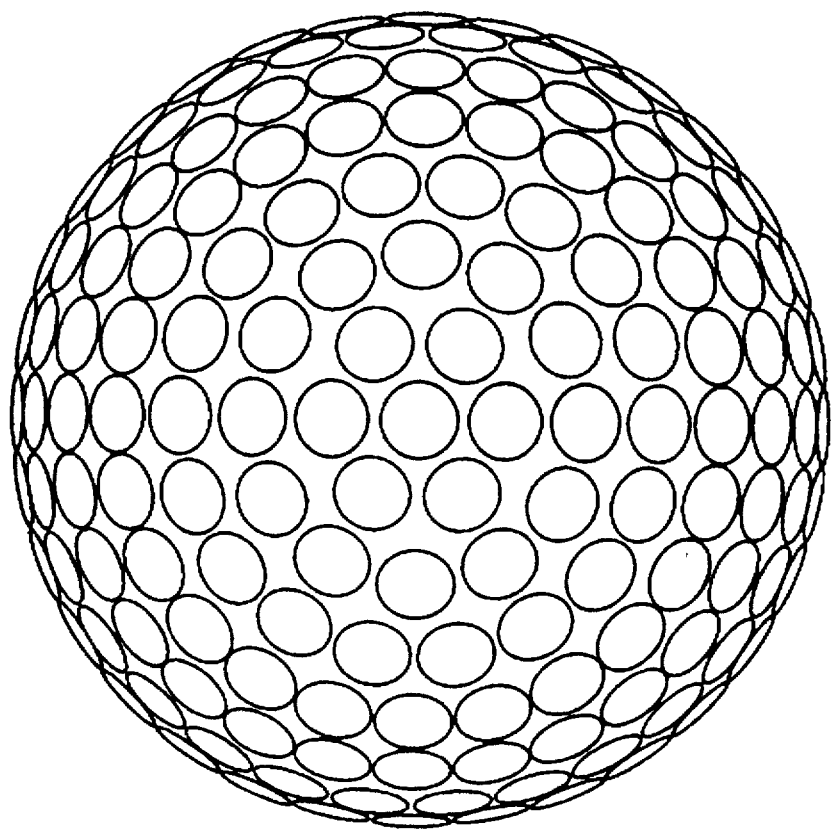

It is desirable that the sky elements whose illumination intensities are measured be uniformly or evenly distributed throughout the sky or celestial sphere. For instance, it is recommended to measure the intensity value at the center of each of 151 circular sampling areas on the sphere, as indicated in FIGS. 16 and 17. In this instance, the sampling areas are specified by Table 2 below.

TABLE 2

| Band No. | Zone No. | Band Center Altitude (°) | Azimuth Angle Between Adjacent Zone Centers (°) | Angular Zone Width at Band Center (°) |
|---|---|---|---|---|
| 1 | 32 | 6 | 11.25 | 11.19 |
| 2 | 30 | 18 | 12.00 | 11.41 |
| 3 | 28 | 30 | 12.86 | 11.13 |
| 4 | 24 | 42 | 15.00 | 11.15 |
| 5 | 18 | 54 | 20.00 | 11.76 |
| 6 | 12 | 66 | 30.00 | 12.20 |
| 7 | 6 | 78 | 60.00 | 12.47 |
| 8 | 1 | 90 | — | — |

The measurement of the illumination intensities at all the sampling points indicated dove requires about 30 minutes. In view of this, the illumination intensities may be estimated based on the chromaticity and luminance values measured at each sampling point.

Further, the illumination intensities may be estimated based on only the luminance values measured. In this case, any desired sky condition (from cloudy sky to clear sky) may be simulated by changing the turbidity factor $T_{VL}$.

While the embodiments described above are adapted to provide a single vehicle image on the entire screen of the CRT display 38, it is possible to divide the screen into two or more display sections for providing images of a vehicle placed under different weather conditions, for example, so that the two or more vehicle images under different weather conditions may be compared with each other. The color graphic display device according to the present invention may be adapted to display color images of vehicles which are painted in different colors. It is also possible to use two or more cathode ray tubes for color reproduction of the object. The color graphic display device may be adapted to provide an enlarged image of a selected part of the vehicle, on a portion of the CRT screen on which the entire image of the vehicle is displayed.

It is to be noted that the reproduction of the background scene of the vehicle together with the vehicle image is not essential according to the present invention. Where the background scene is not displayed, the vehicle image reproduced on the screen may be surrounded by a boundary zone which has suitable chromaticity and luminance values.

It is also to be noted that the color graphic display is not limited to a cathode ray tube or other display device having light emitting elements for image reproduction, but the terms "color graphic display" and "color graphic display device" should be interpreted to mean not only a display or indicator device, but also any other means for providing a color image of the object, such as a color printer adapted to provide a color image on a paper or other suitable recording medium. That is, the color graphic display device of the present invention may use any display means capable of providing a color image of an object that can be perceived by the viewer.

It is to be understood that the present invention may be embodied with various other changes, modifications and improvements, which may occur to those skilled in the art, in view of the foregoing teachings.

What is claimed is:

1. A color graphic display system for providing a color image of an object having a surface, comprising:

profile-data memory means for storing profile data associated with a profile of said object;

luminance-data measuring means for actually measuring luminance values of sun and elements of sky at different positions on earth at which said object is to be placed;

luminance-data memory means for storing sets of luminance data representative of said actually measured luminance values of the sun and said elements of the sky;

relationship memory means for storing relationship data representative of a predetermined relationship between said luminance values and a correlated color temperature;

spectral-distribution-data generating means for determining values of said correlated color temperature corresponding to said luminance values actually measured at said different positions on earth, based on said luminance data and according to said predetermined relationship, said spectral-distribution-data generating means determining, based on the determined values of said correlated color temperature, spectral-distribution data representative of spectral distributions of incident radiations incident upon said object at said different positions;

display data generating means for generating display data based on said profile data stored in said profile-data memory means, and said spectral distribution of the incident radiations incident upon said object; and a color graphic display for providing a color image of said object based on said display data.

2. A color graphic display system according to claim 1, wherein said luminance data further includes chromaticity data representative of chromaticity values of the sun and said elements of the sky actually measured at said positions, said means for generating said spectral-distribution data generating said spectral-distribution data based on said chromaticity data as well as said luminance data.

3. A color graphic display device for providing a color image of an object, comprising:

profile-data memory means for storing profile data associated with a profile of said object;

incident-radiation-data memory means for storing incident-radiation data associated with a spectral distribution of an incident radiation which is to be incident upon a surface of said object;

reflection-characteristic-data memory means for storing reflection-characteristic data associated with spectral reflection characteristics of said surface of the object;

display data generating means for generating display data based on said profile data stored in said profile-data memory means, said incident-radiation data stored in said incident-radiation-data memory means, and said reflection characteristic data stored in said reflection-characteristic-data memory means; and a color graphic display for providing a color image of said object based on said display data;

wherein said reflection-characteristic data stored in said reflection-characteristic-data memory means includes a set of data representative of a spectral reflectance factor of a material which defines a surface of said object and said reflection-characteristic data further includes a set of data representative of a direct reflectance value of a surface of said object, said direct reflectance value being expressed by the following equation:

$$f=(pr_s^2+sr_p^2)/(ss+p)$$

where, $r_s$=amplitude reflectance of an s-component of Fresnel wave, $r_p$=amplitude reflectance of a p-component of Fresnel wave, s=energy ratio of an s-component of the incident radiation, and p=energy ratio of a p-component of the incident radiation.

4. A color graphic display system according to claim 3, further comprising means for actually measuring $r_s$, $r_p$, s, and p values in said equation.

5. A color graphic display system for providing a color image of an object, comprising:

profile-data memory means for storing profile data associated with a profile of said object;

incident-radiation-data memory means for storing incident-radiation data associated with spectral distributions of incident radiations which are to be incident upon a surface of said object at respective different positions on earth;

said incident-radiation data including sets of position data representative of said different positions on earth, respectively, sets of optical characteristic data representative of optical characteristics of atmospheres at said different positions, respectively, and sets of time data representative of times of a day, respectively;

spectral-distribution-data generating means for generating spectral-distribution data,representative of said spectral distributions of said incident radiations, said spectral-distribution-data generating means comprising means for determining an altitude and an azimuth angle of a sun at one of said times of a day at one of said different positions on earth, based on corresponding sets of said position data and said time data, means for calculating an air mass based on the determined altitude and azimuth angle of the sun, and means for determining at least an illumination intensity of a direct solar radiation and a luminance of a diffuse sky radiation which are incident upon said object at said one of said times of a day and at said one of said different positions on earth, based on the calculated air mass and a corresponding set of optical characteristic data;

reflection-characteristic-data memory means for storing reflection-characteristic data associated with spectral reflection characteristics of said surface of the object; and display data generating means for generating display data based on said profile data stored in said profile-data memory means, said spectral-distribution data generated by said spectral-distribution-data generating means, and said reflection-characteristic data stored in said reflection-characteristic-data memory means.

6. A method of simulating a color image of an object on a color graphic display, comprising the steps of:

storing in a profile-data memory means, profile data associated with a profile of said object;

measuring, using a sun-photometer, an incidence coefficient representing dependence of an atmospheric scattering on a wavelength of an incident radiation which is to be incident upon said object at different positions on earth, and a turbidity coefficient of an atmosphere at each of said different positions on earth;

measuring, by an ozone measuring instrument, an ozone coefficient of absorption by ozone in the atmosphere at each of said different positions on earth;

storing in an incident-radiation-data memory means sets of incident-radiation data associated with spectral distributions of the incident radiation which is to be incident upon said object at respective ones of said different positions on earth, said incident-radiation data including data representative of said incidence coefficient, said turbidity coefficient, and said ozone coefficient;

storing in a reflection-characteristic-data memory means reflection-characteristic data associated with spectral reflection characteristics of a surface of said object;

generating a set of display data based on said profile data, one of said sets of incident-radiation data, and said reflection-characteristic data stored in said reflection-characteristic-data memory means, said one of said sets of incident-radiation data corresponding to a desired one of said different positions on earth; and activating a color graphic display to provide a color image of said object placed at said desired one of said different positions on earth, based on said set of display data.

7. A method according to claims 6, further comprising the steps of:

measuring, by a water vapor measuring instrument, a coefficient of attenuation by a water vapor in the atmosphere at each of said different positions on the earth; and measuring, by an oxygen measuring instrument, a coefficient of attenuation by oxygen in the atmosphere at each of said different positions on the earth, and wherein said incident-radiation data further including data representative of said coefficients of attenuation by said water vapor and oxygen.

* * * * *

UNITED STATES PATENT AND TRADEMARK OFFICE
CERTIFICATE OF CORRECTION

PATENT NO. : 5,485,556
DATED : January 16, 1996
INVENTOR(S) : Atsushi TAKAGI et al.

It is certified that error appears in the above-indentified patent and that said Letters Patent is hereby corrected as shown below:

In claim 3, col. 19, line 26, "(ss+p)" should read --(s+p)--.

In claim 5, col. 19, line 56, "data,representative" should read --data representative--.

Signed and Sealed this

Ninth Day of July, 1996

Attest:

BRUCE LEHMAN

Attesting Officer        Commissioner of Patents and Trademarks